US012783958B2

(12) United States Patent
Schuetz et al.

(10) Patent No.: US 12,783,958 B2
(45) Date of Patent: Nov. 3, 2026

(54) AUTOMATED DATA GENERATION FOR INTENT CLASSIFICATION MODELS

(71) Applicant: SAP SE, Walldorf (DE)

(72) Inventors: Sebastian Schuetz, Mannheim (DE); Julian Seibel, Hauenstein (DE); Manuel Mecke, Oestringen (DE); Jonas Brand, Wiesloch (DE)

(73) Assignee: SAP SE, Walldorf (DE)

( * ) Notice: Subject to any disclaimer, the term of this patent is extended or adjusted under 35 U.S.C. 154(b) by 508 days.

(21) Appl. No.: 18/418,632

(22) Filed: Jan. 22, 2024

(65) Prior Publication Data

US 2025/0238707 A1 Jul. 24, 2025

(51) Int. Cl.
*G06N 3/045* (2023.01)
*G06N 20/00* (2019.01)

(52) U.S. Cl.
CPC ............. *G06N 20/00* (2019.01); *G06N 3/045* (2023.01)

(58) Field of Classification Search
CPC ............................... G06N 3/045; G06N 20/00
See application file for complete search history.

(56) References Cited

U.S. PATENT DOCUMENTS

2019/0286451 A1 9/2019 Awadallah et al.
2023/0141398 A1* 5/2023 Bahdanau ............... G06F 40/30 704/9
2024/0378399 A1* 11/2024 Gandhi ................. G06F 16/243
2025/0021769 A1* 1/2025 Buckley ..................... G06F 8/30
2025/0095638 A1* 3/2025 Cho ....................... G10L 15/063
2026/0141470 A1* 5/2026 Everest ................ G06Q 50/205

OTHER PUBLICATIONS

Dzeparoska, Kristina, et al. "LLM-based policy generation for intent-based management of applications." 2023 19th International Conference on Network and Service Management (CNSM). IEEE, 2023. (Year: 2023).*
"European Application No. 24120773.8 Extended European Search Report mailed on Apr. 11, 2025", 13 pgs.

(Continued)

*Primary Examiner* — Hal Schnee
(74) *Attorney, Agent, or Firm* — SCHWEGMAN LUNDBERG & WOESSNER, P.A.

(57) ABSTRACT

Example systems and methods described herein relate to the automated generation of sample expressions. Metadata is accessed for each of a plurality of applications. The metadata includes a functional description of each application. Prompt data is provided to a generative machine learning model. The prompt data includes the metadata for each of the plurality of applications and an instruction to generate, for each of the plurality of applications, a plurality of sample expressions corresponding to user input provided to a digital assistant to invoke an action related to the application. One or more responses that were generated by the generative machine learning model based on the prompt data are processed to obtain output data including the plurality of sample expressions for each of the plurality of applications in a structured format. The output data is used to configure the digital assistant.

20 Claims, 8 Drawing Sheets

(56) References Cited

OTHER PUBLICATIONS

Rosenbaum, Andy, “Using large language models (LLMs) to synthesize training data”, Retrieved from the Internet: URL:https: web.archive.org. web 20231003045243 https: www.amazon. science blog using-large-language-models-llms-to-synthesizetraining-data[retrieved on Apr. 2, 2025], (Jan. 20, 2023), 15 pgs.
Xu, Qiantong, “On the Tool Manipulation Capability of Open-source Large Language Models”, arXiv:2305.16504v1, (May 25, 2023), 25 pgs.
“European Application No. 24210773.8 Communication pursuant to Article 943 EPC mailed on Apr. 8, 2026”, 15 pgs.

* cited by examiner

AUTOMATED DATA GENERATION FOR INTENT CLASSIFICATION MODELS

TECHNICAL FIELD

The subject matter disclosed herein generally relates to digital assistant technology. More specifically, but not exclusively, the subject matter disclosed herein relates to automated data generation for an intent classification model that is suitable for use in a digital assistant.

BACKGROUND

Various digital assistants, such as chatbots and other conversational agents, have been developed over the years. A digital assistant may be configured to perform intent classification to identify intents conveyed by user inputs. This enables the digital assistant to trigger an appropriate action that corresponds to an identified intent. For example, when a user accesses a web interface with a digital assistant feature and enters "I would like to create a purchase order," the digital assistant responds by directing the user to a software application or feature that provides the desired functionality.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
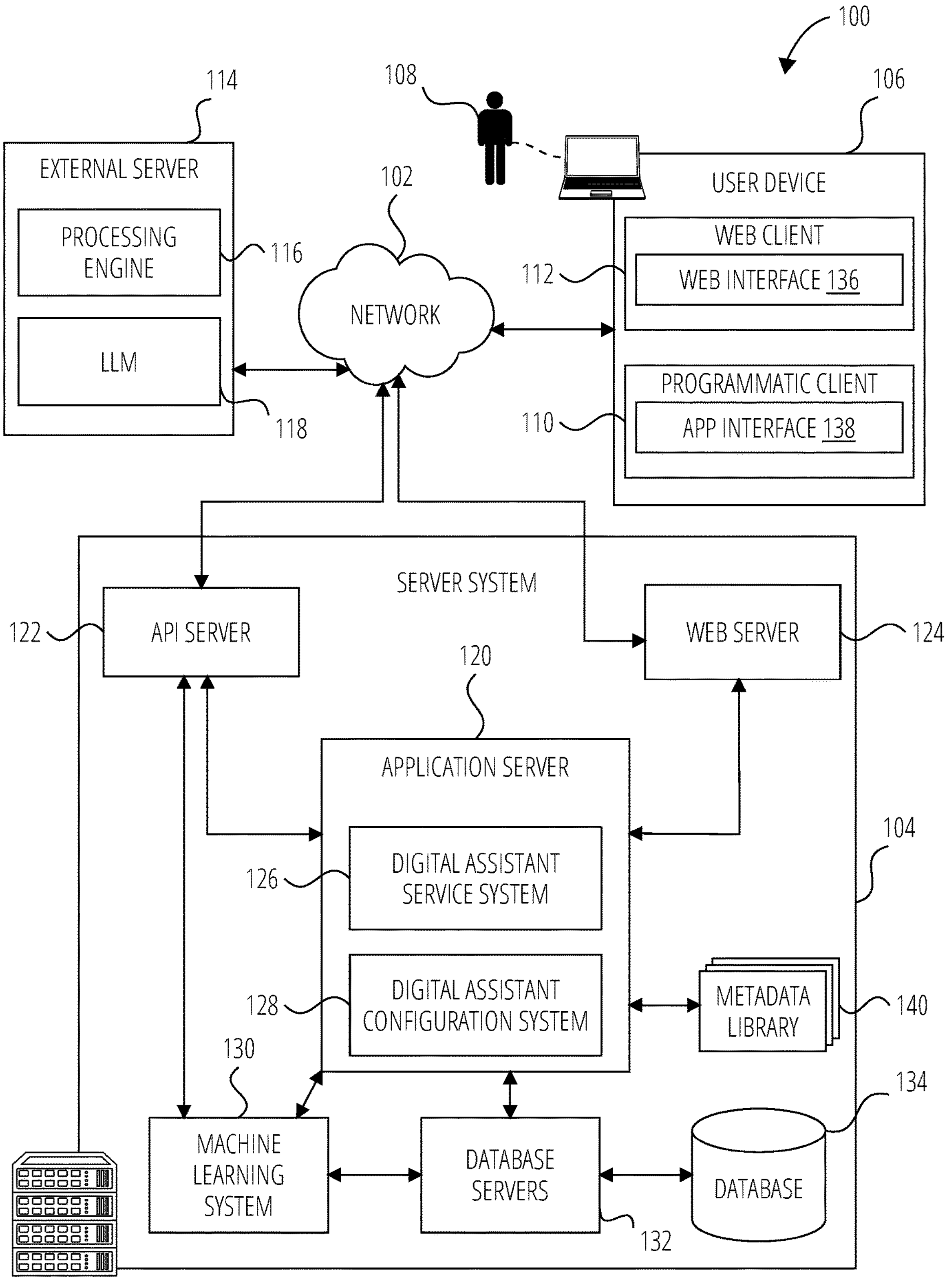
FIG. 1 is a diagrammatic representation of a network environment that includes a digital assistant service system and a digital assistant configuration system, according to some examples.

A machine learning model can be trained to perform intent classification in the context of a digital assistant. Such a machine learning model may thus be referred to as an "intent classification model." Samples of user input (either real or notional) that should invoke each specific action are usually needed to train and test an intent classification model. These samples are referred to in this disclosure as "sample expressions." A sample expression may be a representation of user input or potential user input that is indicative of the intent of a user when interacting with a digital assistant. A sample expression may be represented in text format (e.g., in natural language format). Sample expressions may provide illustrative examples that encompass a variety of phrasings, linguistic constructs, or terminologies that users may employ to convey a specific request or command.

Obtaining sufficient sample expressions that are diverse and of acceptable quality can be an inefficient or technically challenging process. It is common for sample expressions to be created by human experts for use in the configuration of a digital assistant. To create sample expressions of sufficient diversity and quality, a human expert may need to have a deep understanding of (a) the underlying business scenarios relating to actions supported by a digital assistant, (b) language and language modeling (e.g., to allow for the correct modeling of semantically similar intents to different actions), and (c) how text classification systems, such as intent classification models, are designed and used. If sample expressions are not created correctly, a digital assistant may ultimately fail to provide desired system-user interaction features.

Furthermore, in some cases, a large number of sample expressions are needed to model a range of intents and actions. For example, a digital assistant may be configured to direct a user to one of hundreds or even thousands of applications that provide functionalities sought by the user. In such cases, it may be necessary to model hundreds or thousands (or even tens of thousands or hundreds of thousands) of intents, each requiring, for example, 10 to 50 sample expressions. Where human experts are tasked with creating the sample expressions, this exercise may be challenging and time-consuming. Moreover, significant costs can be incurred where human experts create such samples.

In light of at least the aforementioned issues, it may be desirable to automate the process of generating sample expressions. Examples described herein leverage generative artificial intelligence (AI) to implement a process for the generation of sample expressions to configure a digital assistant, while addressing or alleviating technical challenges associated with the implementation of the process.

An example method may include accessing metadata comprising a functional description related to a software application (referred to hereafter simply as an "application" for ease of reference). In some examples, respective metadata is accessed for each of a plurality of applications. For example, a system as described herein may access an application metadata repository (e.g., an application metadata library or a database) containing metadata for each of a plurality of applications.

The term "metadata," as used herein in the context of an application, refers to data that describes, identifies, or facilitates understanding of any aspect of the application. For example, the metadata may include one or more of a name of the application, its functional description (e.g., a description of features, modules, user options, use cases, or benefits), an application type or category, device types associated with the application, implementation details, or an operational context of the application. The prompt data, including the metadata, may be provided in a natural language format.

The method may include providing, to a generative machine learning model (e.g., a large language model (LLM)), prompt data comprising the metadata for each application and an instruction to generate a plurality of sample expressions corresponding to user input provided to a digital assistant to invoke an action related to the application. The term "digital assistant," as used herein, refers to a software agent, application, or software-driven system that can interpret user input (e.g., user requests, user commands, or user messages), execute or trigger associated actions, and provide responses (e.g., informational content or links to content) back to the user, including through natural language conversations. Examples of digital assistants include chatbots, conversational agents, and voice assistants. While non-limiting examples described herein focus on text inputs and text outputs provided in a user interface (e.g., on a display of a user device), it is noted that a digital assistant may interact with a user via various modalities, such as text, speech, touch, or combinations thereof.

In some examples, the prompt data includes a prompt per application or an instruction per application. The prompt data may be structured to elicit, from the generative machine learning model, a set of sample expressions corresponding to appropriate user inputs that should trigger the action related to the application. Accordingly, in some examples, for each of the plurality of applications, the plurality of sample expressions correspond to user input notionally provided to the digital assistant to convey one or more intents linked to the action within the digital assistant.

An intent may represent a purpose or goal of (or behind) user input. The intent may be linked or mapped to one or more actions within the digital assistant. Intents may be used to guide responses to user inputs. For instance, intents may include items such as "create_invoice," "retrieve_invoice," "book_flight," "check_weather," or "order_equipment," each corresponding to one or a set of actions that the digital assistant should perform to fulfill or respond to the request.

The instruction in the prompt data may identify a response format in which to provide the one or more responses. One or more responses generated by the generative machine learning model may be processed to obtain output data comprising the plurality of sample expressions (e.g., for each of the plurality of applications) in a structured format. The system may process the output data by parsing the one or more responses provided in the response format to obtain the output data in the structured format. The output data may be used to configure the digital assistant.

The output data may be used to train an intent classification model of the digital assistant. An example of an intent classification model is a supervised text classification model. The method may include, subsequent to the configuration of the digital assistant, receiving first user input comprising a first expression, processing the first expression using the intent classification model to obtain an intent classification for the first expression, and identifying, based on the intent classification, a first application of the plurality of applications. The method may also include invoking the action related to the application. For example, based on the first user input, the intent classification model may identify a likely intent of the first expression, with the digital assistant having a mapping from the intent to the action. Similar operations may be performed with respect to a second expression provided in second user input, a third expression provided in third user input, and so forth.

The action corresponding to an intent may, for example, be to provide a user of the digital assistant with access to an application (or feature of an application). The method may include generating an interface element that is user-selectable to provide access to the application, and causing presentation, at a user device associated with the user, of the interface element in a user interface of the digital assistant. For example, the interface element can include a link to the application. In some examples, the user interface is a first user interface, and the method further includes receiving second user input comprising a user selection of the interface element, and, in response to receiving the user selection, causing presentation, at the user device of the user, of a second user interface of the application. For example, the application may be a web application, with selection of the link navigating the user to the web application.

In some examples, the output data is used to generate one or more configuration files of the digital assistant. For example, one or more of the sample expressions may be integrated into a configuration file of the digital assistant to facilitate user interaction.

The term "configuration file," as used herein in the context of a digital assistant, refers to a digital document that contains settings, parameters, or instructions used to define and control the behavior of the digital assistant. A configuration file may be written in human-readable and machine-parsable formats, such as Extensible Markup Language (XML), JavaScript Object Notation (JSON), or YAML Ain't Markup Language (YAML). A configuration file, or set of configuration files, may dictate how a digital assistant should interpret user inputs, identify intents, map intents to actions, execute actions, generate messages, or interact with other systems or services. Configuration files may include definitions of intents, associated actions, dialogue flows, user interface customizations, and links to external applications or Application Programming Interfaces (APIs). The configuration file may also instruct the digital assistant on how to use an intent classification model to automatically obtain intents or actions when user input is received.

The "configuration" of the digital assistant may include various operations, including one or more of model training, testing, intent mapping, parameter creation, configuration file generation, or combinations thereof. In a testing context, for example, the method may include providing at least a subset of the plurality of sample expressions for each of the plurality of applications to the digital assistant as test inputs to obtain test responses. The test responses may be processed to generate performance data for the digital assistant based on one or more performance metrics (e.g., by comparing the test responses to a set of expected responses). The performance data may be presented in a user interface.

The prompt data may further include one or more of a role definition indicating a role of the generative machine learning model, an indication of a predetermined number of sample expressions to generate for each of the plurality of applications, or illustrative examples of sample expressions. The method may include dynamically and automatically populating a template to generate a prompt to feed to the generative machine learning model. For example, for each of the plurality of applications, the system may access a prompt template in which a first subset of the prompt data is prepopulated (e.g., generic language that is used across a plurality of prompts for different applications or features). An application metadata repository may be accessed to obtain a second subset of the prompt data that includes the functional description of a particular application (and optionally other metadata specific to the application).

The method may include automatically integrating the second subset of the prompt data into the first subset of the prompt data prior to providing the prompt data to the generative machine learning model. In some examples, the system performs a data cleaning operation on the second subset of the prompt data prior to integrating the second subset of the prompt data into the first subset of the prompt data. Data cleaning may include one or more of removing or replacing incorrect or corrupt data, standardizing data formats, eliminating duplicates, or filtering out noise or unwanted data, such as irrelevant symbols, formatting characters, or markup language tags. For instance, a data cleaning operation might involve stripping HyperText Markup Language (HTML) tags from functional descriptions in the metadata to ensure that the generative machine learning model receives and processes only relevant textual content, or processes a higher proportion of relevant textual content.

Examples described herein may provide technical benefits when compared to other data generation or digital assistant modeling approaches. When compared to approaches that utilize human experts or deterministic systems (e.g., fixed text generation patterns) to craft sample expressions for the training of a machine learning model, examples described herein may provide for improved data quality, accuracy, or diversity. For example, the technical problem of creating high-quality and diverse training data, at scale, for intent classification models in digital assistants can be addressed by automatically creating structured prompts that guide a generative machine learning model to produce varied and comprehensive sample expressions.

Further, examples described herein may provide for more efficient digital assistant configuration. Examples described herein may provide cost-related or time-related efficiency improvements. For example, a large number of sample expressions of high quality may be automatically generated in a relatively short period of time, and at a lower overall cost.

Moreover, examples described herein may provide improvements in the field of digital assistant configuration technology by making it easier for developers to configure digital assistants. For example, a developer may be enabled to configure a useful or powerful digital assistant without having to possess expertise in (or requiring less expertise in) language, language modeling, or intent classification systems.

When compared to the approach of leveraging a generative machine learning model (e.g., an LLM) directly to perform natural language understanding at runtime (e.g., injecting an LLM into a digital assistant to provide dynamic responses at runtime), examples described herein may provide technical benefits, such as faster response times or lower computational costs. For example, by utilizing the outputs of a generative machine learning model to train a more "classical" intent classification model for use in the digital assistant at runtime (as opposed to using the generative machine learning model at runtime), the digital assistant can scale better, both from a cost and latency perspective, because using the intent classification model may be less expensive than calling the generative machine learning model for each user input, while also providing faster responses to user input. Accordingly, examples described herein may address one or more technical problems associated with the use of generative AI directly for natural language understanding in real-time digital assistant implementations.

Examples described herein may, alternatively or additionally, address or alleviate the technical problem of inefficient processing of large volumes of unstructured data to accurately recognize user intents in digital assistants. For example, a computing system may struggle with the extraction and classification of relevant information from diverse and complex datasets, leading to suboptimal performance in intent recognition. Examples described herein intelligently extract data and create target prompts, while employing AI to generate high-quality training data to develop robust classification models for digital assistants. A classification model that is created using such training data may improve the technical field of digital assistants by enhancing the ability of a digital assistant to process and classify user inputs.

When the effects in this disclosure are considered in aggregate, one or more of the methodologies described herein may thus obviate a need for certain efforts or resources that otherwise would be involved in developing or deploying digital assistants. In some cases, computing resources utilized by systems, devices, databases, or networks may be more efficiently utilized or reduced as a result of the automated generation of large numbers (e.g., hundreds or thousands) of sample expressions. In some cases, computing resources utilized by systems, devices, databases, or networks may be more efficiently utilized or reduced as a result of the use of a more lightweight machine learning model (e.g., a classifier model) at runtime to handle user queries, while only using a more computationally intensive machine learning model (e.g., a generative model) during configuration of the digital assistant. Examples of such computing resources may include processor cycles, Graphics Processing Unit (GPU) resources, network traffic, memory usage, data storage capacity, power consumption, and cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 112 (e.g., a browser) or a programmatic client 110 (e.g., an application or "app") may be hosted and executed on the user device 106.

An API server 122 and a web server 124 provide respective programmatic and web interfaces to components of the server system 104. An application server 120 hosts a digital assistant service system 126 and a digital assistant configuration system 128, which includes components, modules, or applications. It will be appreciated that the digital assistant service system 126 and the digital assistant configuration system 128 may be hosted across multiple application servers in other examples.

The user device 106 can communicate with the application server 120. For example, the user device 106 can communicate with the application server 120 via the web interface supported by the web server 124 or via the programmatic interface provided by the API server 122. It will be appreciated that, although only a single user device 106 is shown in FIG. 1, a plurality of user devices may be communicatively coupled to the server system 104 in some examples. For example, multiple users may access the digital assistant service system 126 using respective user devices to utilize functionality of multiple applications provided via the server system 104, or to utilize the functionality of one or multiple digital assistants that are designed to help users of the applications. Also, multiple users may access the digital assistant configuration system 128 to perform or facilitate the configuration of one or multiple digital assistants. While certain functions may be described herein as being performed at either the user device 106 (e.g., web client 112 or programmatic client 110) or the server system 104, the location of certain functionality either within the user device 106 or the server system 104 may be a design choice.

The application server 120 is communicatively coupled to database servers 132, facilitating access to one or more information storage repository, such as a database 134. In some examples, the database 134 includes storage devices that store information to be processed by the digital assistant service system 126, the digital assistant configuration system 128, or one or more other components shown in FIG. 1. For example, the database 134 may store application data associated with applications that can be accessed via the server system 104.

The application server 120 may thus access application data (e.g., application data stored by the database servers 132) to provide one or more applications or software tools to the user device 106 via a web interface 136 or an app interface 138. In particular, the user 108 is enabled to access a digital assistant provided by the digital assistant service system 126 via the user device 106. The digital assistant may assist the user 108 in accessing or navigating to applications supported by the server system 104, as described in greater detail elsewhere herein.

In some examples, and as shown in FIG. 1, a metadata library 140 may be provided in the server system 104 which provides metadata relating to each of a plurality of applications. Where the server system 104 provides users with access to multiple applications (e.g., web applications that provide various business-related tools or functions), the metadata library 140 may include a curated collection of metadata specific to such applications. The metadata library 140 contains descriptive information about various applications, such as their names, descriptions, functionalities, usage scenarios, goals, outcomes, or other relevant details. The metadata may thus provide resources to understand the scope and capabilities of applications supported by the server system 104. As described elsewhere herein, the metadata in the metadata library 140 may be used to generate sample expressions or to train an intent classification model.

The types or scope of metadata in the metadata library 140 may depend on the implementation. For example, where the server system 104 is accessed to utilize finance-related or accounting-related business applications, the metadata library 140 may contain information about applications that enable purchase order creation, sales order creation, billing, or the like. Where the server system 104 is accessed to utilize office productivity tools, the metadata library 140 may contain information about word processing, spreadsheet, presentation, or email applications, detailing their features and typical use cases. The digital assistant configuration system 128 may, for example, automatically access the metadata library 140 via a web interface to obtain the metadata.

The digital assistant service system 126 functions to handle user interactions and fulfillment of capabilities for the digital assistant. The digital assistant service system 126 includes various components to interpret user input, determine and invoke appropriate actions, generate responses, and integrate with external systems. In some examples, the digital assistant service system 126 enables natural language conversations by receiving user input, analyzing input to determine appropriate responses, invoking actions or functions to execute capabilities, and generating conversational responses.

In some examples, the digital assistant service system 126 maintains context to enable dialogs spanning multiple exchanges. As described in greater detail elsewhere, the digital assistant service system 126 may provide a modular architecture that integrates or couples with external systems or applications (e.g., via standardized interfaces).

The digital assistant service system 126 can integrate or communicate with a variety of platforms and endpoints. For example, the user 108 may access a digital assistant provided by the digital assistant service system 126 via the web client 112 or the programmatic client 110, and interact with the digital assistant via the web interface 136 or the app interface 138.

In some examples, the user 108 uses the web interface 136 of the web client 112 of the user device 106 to access the environment provided by the digital assistant service system 126. For example, the web client 112 may transmit instructions to and receive responses from the server system 104 to allow it to update a user interface, creating a dynamic and interactive web application experience. In some examples, the digital assistant is provided as a support tool that is presented as a window in association with a primary application or dashboard. The digital assistant service system 126 may add a conversational experience "on top of" a standard user interface provided by the web client 112 and web interface 136 at the user device 106.

In other examples, at least parts of the digital assistant may run on the web client 112 and its user interface can be updated, at least in some cases, without transmitting instructions to and receiving response from the server system 104. Accordingly, while the digital assistant service system 126 is shown as residing within the server system 104 in FIG. 1, it will be appreciated that functionality or features of the digital assistant service system 126 may be provided so as to run at least partially at the user device 106.

The digital assistant configuration system 128 depicted in FIG. 1 provides an environment for the configuration (e.g., creation, training, testing, or refinement) of a digital assistant's capabilities. The digital assistant configuration system 128 is designed to interface with a machine learning system 130 to facilitate the generation of training or test data for intent classification models. The digital assistant configuration system 128 or the machine learning system 130 may be designed to interface with a generative AI component for the generation of sample expressions. The generative AI component may be hosted on an external server 114 that provides a processing engine 116 and a trained model, such as an LLM 118 (as an example of a generative machine learning model), as shown in FIG. 1. However, in other examples, the generative machine learning model may be internally hosted.

The digital assistant configuration system 128 may be configured to enable collection and preprocessing of application metadata, construction of prompts for a generative machine learning model, and the processing of responses from the generative machine learning model into a structured format suitable for configuring (e.g., training) a digital assistant. For example, the digital assistant configuration system 128 may collect metadata relating to an invoice management application, use this data to generate a prompt that instructs the LLM 118 to produce a variety of user expressions for performing functions in the context of the invoice management application, and then format the generated expressions into a structured file (e.g., JSON file or YAML file) that can be used in the training of an intent classification model of the digital assistant implemented by the digital assistant service system 126. This process may be repeated for a plurality of different applications that are supported by the server system 104 and are "known" to the digital assistant.

In some examples, the machine learning system 130 provides machine learning pipelines and models used for generating intent classifications, recognizing intents, or identifying digital assistant actions. The machine learning system 130 may provide various capabilities, such as training models, performing inference, and monitoring performance. In some examples, the digital assistant configuration system 128 integrates with the machine learning system 130 to facilitate or improve a machine learning pipeline.

The machine learning system 130 may provide automated machine learning capabilities that can generate pipelines tailored to a given process. The machine learning system 130 may determine aspects such as the appropriate data preprocessing, feature engineering, model algorithms, and hyperparameters to use.

The machine learning system 130 may leverage training data sets (e.g., training data sets including sample expressions stored in the database 134) to intelligently construct a custom machine learning pipeline. The pipeline provided by the machine learning system 130 may then be used to train, evaluate, and select a model for deployment. This automation may eliminate or reduce the need for time-consuming manual development or refinement of machine learning solutions.

In some examples, the application server 120 is part of a cloud-based platform provided by a software provider that allows a user to utilize the features of applications supported by the cloud-based platform, as well as features of the digital assistant service system 126 or the digital assistant configuration system 128. One or more of the application server 120, the database servers 132, the API server 122, the web server 124, the digital assistant service system 126, the digital assistant configuration system 128, or the machine learning system 130, or parts thereof, may each be implemented in a computer system, in whole or in part, as described below with respect to FIG. 9.

In some examples, external applications (which may be third-party applications), such as applications executing on the external server 114, can communicate with the application server 120 via the programmatic interface provided by the API server 122. For example, a third-party application may support one or more features or functions on a website or platform hosted by a third party, or may perform certain methodologies and provide input or output information to the application server 120 for further processing or publication.

Referring more specifically now to the external server 114, the external server 114 houses the LLM 118 and related processing capabilities. The external server 114 may provide an external, scalable server environment dedicated to running and serving queries to the LLM 118.

The LLM 118 may be a computational model developed for the tasks of processing, generating, and understanding human language. It employs machine learning methodologies, including deep learning architectures. The training of the LLM 118 may utilize comprehensive data sets, such as vast data sets of textual content, to enable the LLM 118 to recognize patterns in human language. The LLM 118 may be built upon a neural network framework, such as the transformer architecture. The LLM 118 may contain a significant number of parameters (e.g., in excess of a billion), which are adjusted during training to optimize performance. The LLM 118 is a non-limiting example of a generative machine learning model. Machine learning techniques are described in greater detail with reference to FIG. 7.

The processing engine 116 may be a component running on the external server 114 that is communicatively coupled to the LLM 118. The processing engine 116 may handle certain preprocessing of data before sending it to the LLM 118 and certain postprocessing of the responses received from the LLM 118. For preprocessing, the processing engine 116 may tokenize, compress, or format the data to optimize it for the LLM 118. For postprocessing, it may format the response received from the LLM 118, perform detokenization or decompression, and prepare the response for sending back to the requesting system (e.g., the digital assistant configuration system 128).

The LLM 118 may provide natural language processing capabilities that can assist with user queries, understanding context or instructions, identifying intents, and generating sample expressions. In some examples, the LLM 118 has been fine-tuned on relevant tasks and conversations to enhance its ability to provide useful troubleshooting insights and solutions. For example, the LLM 118 may be fine-tuned to focus specifically on a functional description of an application and to generate a broad range of sample expressions to capture various use cases or intents that would be linked to a user wanting to use the application.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
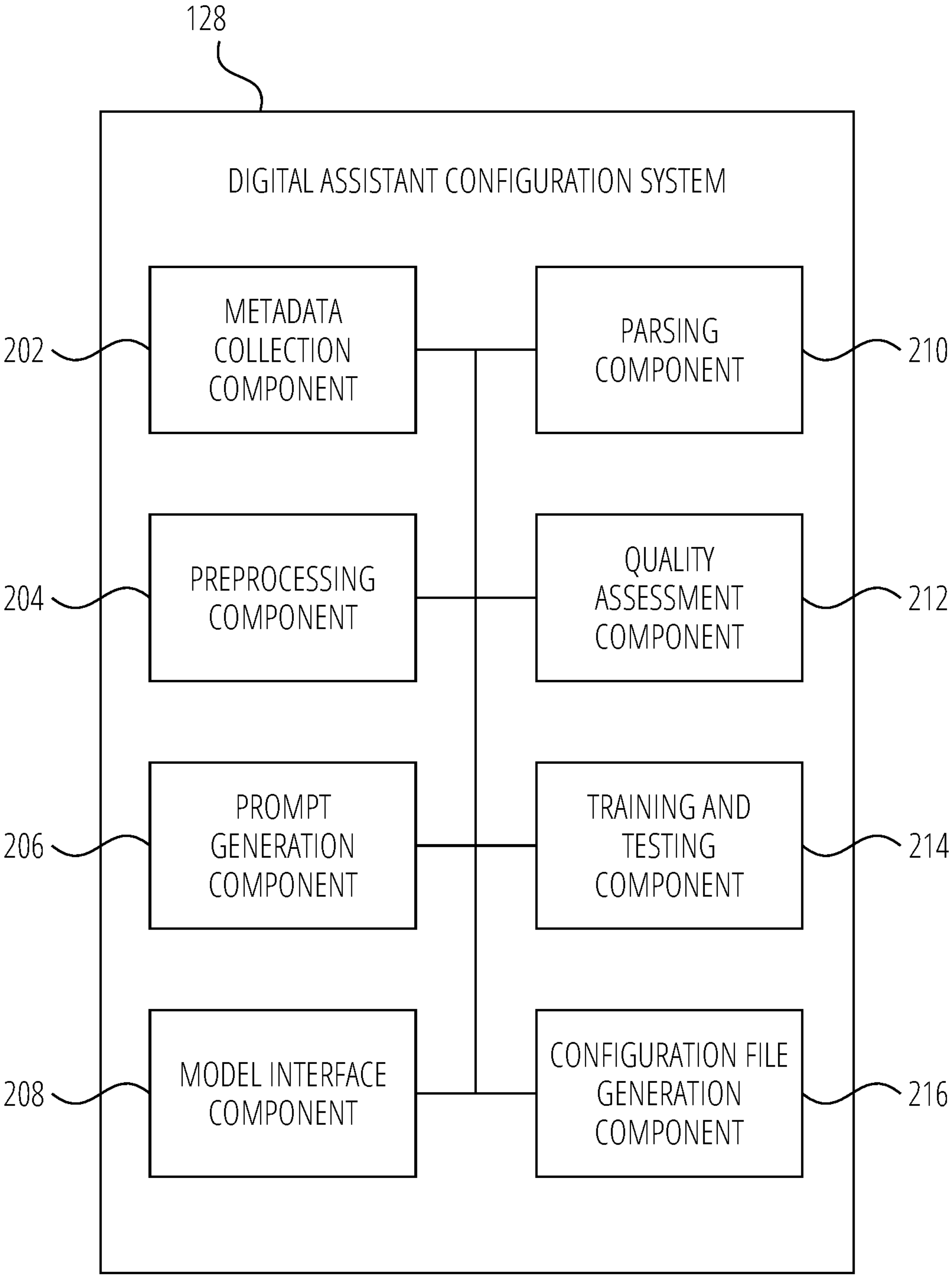
FIG. 2 is a block diagram of certain components of a digital assistant configuration system, according to some examples.

FIG. 2 is a block diagram illustrating certain components of the digital assistant configuration system 128 of FIG. 1, according to some examples. The digital assistant configuration system 128 is shown to include a metadata collection component 202, a preprocessing component 204, a prompt generation component 206, a model interface component 208, a parsing component 210, a quality assessment component 212, a training and testing component 214, and a configuration file generation component 216.

The metadata collection component 202 is responsible for aggregating and organizing metadata for each of a plurality of applications. The metadata collection component 202 receives or fetches the metadata, for example, from the metadata library 140 (e.g., through an HTTP API). As mentioned, the metadata library 140 contains descriptive information that can be fed to a generative machine learning model to generate sample expressions.

Merely as illustrative examples, the metadata library 140 may include metadata for, among others, a "Flight Overview" application and a "Create Inbound Delivery" application in human-readable format. The "Flight Overview" application's metadata may, for example, include the following functional description (among other information): "The flight plan lists all the flights that exist in the system for a given period and thus provides a quick overview of all flight-related data and simplified management of flight operations. The application provides filtering and sorting functions, and supports forward navigation to detail screens for a flight and master equipment." The "Create Inbound Delivery" application's metadata may, for example, include the following functional description (among other information): "With the Create Inbound Delivery App, you can create inbound deliveries based on Expected Goods Receipt Items in Extended Warehouse Management. When a truck arrives at the warehouse and the truck driver goes to the office with the delivery note, the warehouse clerk wants to create a delivery in the system according to the delivery note. They select purchase order items (these are Expected Goods Receipt items) and create the delivery for the purchase order items. They can change the quantity, enter batches, create new batches, and create handling units for the delivery using this App."

The preprocessing component 204 prepares collected or received metadata for prompt generation. The preprocessing component 204 may process raw metadata to adjust formatting or remove extraneous formatting, and standardize the data for ingestion by a generative machine learning model, such as the LLM 118. For example, the preprocessing component 204 may be configured to ensure that the metadata is devoid of HTML tags, markdown, or formatting elements that could potentially "confuse" the LLM 118 or otherwise reduce the quality of sample expressions. In some examples, the preprocessing component 204 may process the collected metadata to leave only plain text that accurately describes or identifies application functionality.

In some examples, the preprocessing component 204 may perform specific formatting to adjust the metadata according to a predetermined data cleaning operation. An example of such a data cleaning operation is provided below for examples in which the raw metadata contains HTML tags and the preprocessing component 204 is designed to ensure that the metadata is made substantially tag-free.

#Containers and Sections—Replace with simple newline (\n)
Replace <ul[^]*?> with \n
Replace </ul> with \n
Replace <li[^]*?> with \n
Replace </li> with \n
Replace <h[1-9]> with \n
Replace </h[1-9]> with \n
Replace <div[^]*?> with \n
Replace </div> with \n
Replace <section[^]*?> with \n
Replace </section> with \n
Replace <aside[^]*?> with \n
Replace </aside> with \n #Text Highlighting-Just removed, no replacement
Remove <b> and </b>
Remove <i> and </i>
Remove <a[^]*?> and </a>
Remove <span[^]*?> and </span>
Remove <strong> and </strong>
Remove <em> and </em>
#New Lines-Replaced with simple newline (\n)
Replace <br[^]*?> with \n
Replace <p[^]*?> with \n
Replace </p> with \n #Remove All Generated Duplicate New Lines-Replaced with
single newline (\n)
Replace multiple occurrences of \n (e.g., \n+) with a single \n The aforementioned algorithm ensures that the input to a generative machine learning model is free of HTML tags and unwanted formatting, which could negatively impact the subsequent processing of the data or the generation of outputs by the generative machine learning model. For example, having HTML tags or other unwanted formatting in text may cause the LLM 118 to generate sample expressions that contain such tags or unwanted formatting (which is undesirable because a real user would typically not include such content in their input). Turning now to the prompt generation component 206, this component is responsible for generating prompts that are used to elicit specific responses from the generative machine learning model. The prompt generation component 206 may utilize the preprocessed metadata to formulate prompts that describe an application so as to guide the generative machine learning model to produce varied expressions for actions that could be of interest with respect to the application.

For example, for a travel booking application, it is desirable to produce sample expressions relating not only to searching for flights, but also booking hotels, renting cars, obtaining restaurant information, and so forth. It is therefore desirable to obtain a range of different sample expressions that cover different goals or intents linked to the same application, which in turn allows a trained intent classification model to detect, with greater accuracy, that user input relates to a particular application.

The prompt data generated by the prompt generation component 206 may introduce the generative machine learning model to the task of generating sample expressions that users would enter into a digital assistant to execute an action. For example, the prompt data may include the following text: "You are a system that generates sample expressions (or example utterances). Sample expressions are examples of expressions that users would enter into a Digital Assistant." The prompt data may further describe the action related to the application that the user wishes to execute. The prompt data may, for example, include the following text: "The user wants to be navigated to an application with the name [Application Name] and the description [App Functional Description]."

Furthermore, the prompt data may indicate that a defined number of sample expressions is needed. For example, the prompt data may include the following text: "Generate 20 very different examples of expressions or utterances that could be entered by a user if they want to perform an action in the application." In the aforementioned example, the predetermined number of sample expressions generated per application is twenty. However, this is a non-limiting example and other numbers may be utilized (e.g., ten, thirty, fifty, one hundred, or five hundred).

The prompt data may also indicate a target format in which the generative machine learning model should provide the sample expressions, as described in greater detail elsewhere. In some examples, for each application or action in respect of which sample expressions are needed, the prompt generation component 206 generates a separate prompt. Alternatively, a single prompt may be generated to instruct the generative machine learning model to generate sample expressions for multiple applications or actions. Accordingly, the term "prompt data," as used herein, may refer to data included in a single prompt or across multiple prompts. In some examples, one or more parts of the prompt data (such as a role definition that applies across multiple prompts) may be provided as a "pre-prompt" portion of the prompt data, given that such data could be included in a context window of the LLM 118 so as to apply to each individual prompt subsequently provided.

Once the prompt generation component 206 has generated prompt data, the model interface component 208 interfaces with the generative machine learning model to transmit the prompt data to the generative machine learning model, and to receive one or more responses from the generative machine learning model. In some examples, the model interface component 208 serves as a conduit between the digital assistant configuration system 128 and the LLM 118. The prompt generation component 206 may handle integration with API endpoints, such as one or more API endpoints of the LLM 118 (e.g., by communicating with the processing engine 116 of the external server 114).

The model interface component 208 may transmit the one or more responses to the parsing component 210 for further handling. The parsing component 210 is designed to analyze and organize raw output received from the generative machine learning model. In some examples, the parsing component 210 systematically extracts the relevant sample expressions from the output of the generative machine learning model and discards any extraneous text or formatting. The parsing component 210 may further structure the sample expressions into a format that is applied across all responses and that is readily usable for training or testing of a digital assistant (or in another configuration operation).

In some examples, the digital assistant configuration system 128 includes the quality assessment component 212 for assessing the sample expressions generated by the generative machine learning model. For example, the quality assessment component 212 may automatically process the sample expressions generated for a particular application and calculate a diversity score, or output an indication of whether certain key terms are presented in the sample expressions. In some examples, the quality assessment component 212 may designate a set of sample expressions as unsuitable for downstream use if certain standards or not met (e.g., if the sample expressions are semantically too similar to each other). However, in other examples, the quality assessment component 212 is not included in the digital assistant configuration system 128.

The training and testing component 214 utilizes the sample expressions generated by the generative machine learning model to configure an intent classification model of a digital assistant, or to trigger or facilitate the configuration thereof. For example, the training and testing component 214 may receive respective sample expressions for thousands of applications in a structured format, and add the sample expressions (or a portion thereof) to a training data set that is used by the machine learning system 130 to train the intent classification model. The training data set may be labeled. For example, each sample expression may be mapped to a particular intent, allowing the intent classification model to learn from the training data set in a supervised manner. A trained intent classification model may be subjected to testing, for example, using a training batch of the sample expressions. The training and testing component 214 may interface or integrate with the machine learning system 130 of FIG. 1 to perform training or testing operations. In some examples, the training and testing component 214 forms part of the machine learning system 130.

The configuration file generation component 216 is responsible for translating a digital assistant into a deployable format. The configuration file generation component 216 generates one or more configuration files that define, for example, intents, actions, and application linkages of the digital assistant. Configuration files may be in a predetermined format, such as YAML or JSON, allowing the digital assistant to be deployed for operation within its service environment. For example, the configuration file generation component 216 may produce a set of YAML files that instruct the digital assistant on how to respond to user queries, including how to respond when an action is identified based on a recognized user intent.

Figure 3:
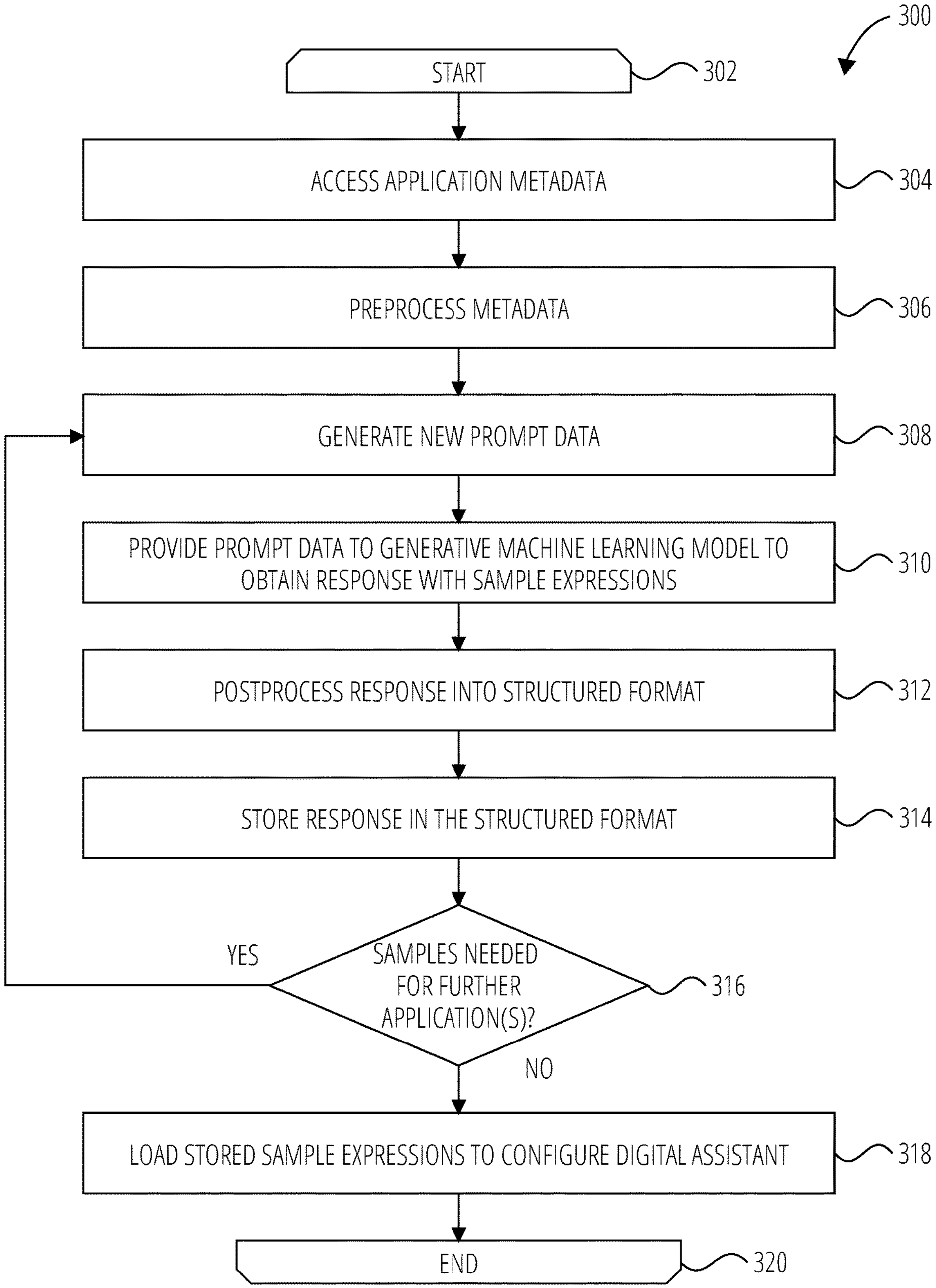
FIG. 3 is a flowchart illustrating operations of a method suitable for generating sample expressions for the configuration of a digital assistant, according to some examples.

FIG. 3 is a flowchart illustrating operations of a method 300 suitable for generating sample expressions for the configuration of a digital assistant, according to some examples. By way of example and not limitation, aspects of the method 300 may be performed by the components, devices, systems, or network shown in FIG. 1 and FIG. 2. Accordingly, elements shown in FIG. 1 and FIG. 2 are referred to in the description below as non-limiting examples.

The method 300 commences at opening loop element 302 and proceeds to operation 304, where the digital assistant configuration system 128 accesses application metadata. For example, the metadata collection component 202 of the digital assistant configuration system 128 collects raw metadata via an HTTP API from the metadata library 140. The metadata includes functional descriptions of various different applications supported by the server system 104 (e.g., hundreds or even thousands of web applications), and the method 300 aims to facilitate the configuration of a digital assistant to respond to queries or commands relating to the various applications. In some examples, metadata is automatically collected from various different sources, such as from the metadata library 140 and one or more other libraries, documents, or databases.

The metadata collected from the metadata library 140 are preprocessed at operation 306 (e.g., by the preprocessing component 204). For example, as described above, markdown and HTML tags, or formatting characters, may be automatically removed from the metadata in a data cleaning operation. Operation 306 may involve aggregating metadata from multiple API endpoints, extracting relevant information, and preparing the information in a format that is easily consumable downstream by a generative machine learning model, such as the LLM 118. In some examples, the preprocessing component 204 generates a cleaned and aggregated data set that includes the metadata for each of the applications in a predetermined format, such as a table format.

At operation 308, the prompt generation component 206 of the digital assistant configuration system 128 generates a new prompt. In the case of the method 300, the prompt relates to a specific (single) application. The prompt includes the metadata for the specific application, for example, to provide the name and a functional description of the application in the prompt. Operation 308 may include accessing the cleaned and aggregated data set and fetching the metadata for the application in question (e.g., obtaining the application name and the functional description from a relevant row and respective columns of a table).

In some examples, the prompt generation component 206 accesses a prompt template and populates the prompt template with data specific to the application in question. For example, the prompt data may include a first subset of prompt data that is used across all prompts, while a second subset of the prompt data is application-specific, and is thus retrieved and populated separately in each case. Examples of the prompt template, as well as a populated prompt template, are provided below. It is noted that, in the populated prompt template, the digital assistant configuration system 128 automatically replaces <application_name> and <application_description> with the relevant application-specific metadata.

Example of a Prompt Template:

You are a system that generates sample expressions (or example utterances). Sample expressions are examples of expressions that users would enter into a Digital Assistant. Those users want to perform an action. This action can be performed in the described application. The application has the name <application_name> and the description <application_description>. Generate 20 very different examples of expressions or utterances that could be entered by a user if they want to perform an action in the application. The expressions must be returned in the following format: \ "1. <expression 1>\n2. <utterance 2>\n3. <utterance 3> . . . \". Do not generate any additional text other than the expressions.

Example of a Prompt in the Form of a Populated Prompt Template for a "Create Inbound Delivery" Application:

You are a system that generates sample expressions (or example utterances). Sample expressions are examples of expressions that users would enter into a Digital Assistant. Those users want to perform an action. This action can be performed in the described application. The application has the name "Create Inbound Delivery" and the description "With the Create Inbound Delivery App, you can create inbound deliveries based on Expected Goods Receipt Items in Extended Warehouse Management. When a truck arrives at the warehouse and the truck driver goes to the office with the delivery note, the warehouse clerk wants to create a delivery in the system according to the delivery note. They select purchase order items (these are Expected Goods Receipt items) and create the delivery for the purchase order items. They can change the quantity, enter batches, create new batches, and create handling units for the delivery using this App." Generate 20 very different examples of expressions or utterances that could be entered by a user if they want to perform an action in the application. The expressions must be returned in the following format: \ "1. <expression 1>\n2. <utterance 2>\n3. <utterance 3> . . . \". Do not generate any additional text other than the expressions.

The method 300 proceeds to operation 310, where the model interface component 208 of the digital assistant configuration system 128 provides the prompt data to the generative machine learning model (e.g., the LLM 118). In response, the digital assistant configuration system 128 obtains a plurality of sample expressions. Where a generative machine learning model such as an LLM is used, the generative machine learning model may be able to process the metadata of the application and generate a diverse and high-quality range of prompts that covers various different features or uses of the application. As another example, the generative machine learning model may be prompted to provide sample expressions for performing actions in an application entitled "Create Sales Order-Automatic Extraction." Based on the title and a functional description of the application, the generative machine learning model generates varying sample expressions that cover a range of features of the application. A non-limiting example of twenty sample expressions is included below merely to illustrate this point with reference to the "Create Sales Order-Automatic Extraction" application.

Sample Expressions Generated for the "Create Sales Order-Automatic Extraction" Application:

1. Open Create Sales Orders—Automatic Extraction and upload a PDF.
2. Create a new sales order with the file Invoice429.pdf.
3. Use Create Sales Orders—Automatic Extraction to import information from PurchaseOrder983.pdf.
4. I want to extract the data from this purchase order.
5. Start a new sales order using data extracted from PDF.
6. Open Create Sales Orders—Automatic Extraction and insert Data from Sample Request.pdf.
7. Automatically populate a new Sales Order from PDF522.pdf.
8. Can you retrieve the sold-to-party information from SalesOrder231.pdf?
9. Use Create Sales Orders—Automatic Extraction to populate the master data from transaction file.
10. In Create Sales Orders—Automatic Extraction, open a new order with info from SalesAgreement32.pdf.
11. Please upload the file Invoice450.pdf in Create Sales Orders—Automatic Extraction.
12. Use Create Sales Orders—Automatic Extraction app to create order from PDF429.pdf.
13. Export the data from this PDF into a new sales order request.
14. Create a sales order request using the data from this PDF.
15. Upload PurchaseOrder957.pdf and populate sales order.
16. Extract data from ProcureOrder587.pdf using Create Sales Orders—Automatic Extraction.
17. In Create Sales Orders app, start new order with details from PurchaseReceipt589.pdf.
18. Load PDF file into Create Sales Orders—Automatic Extraction and extract sold-to party.
19. I need to create a new sales order from Invoice873.pdf.
20. Initiate new sales order using the information from SalesMemo789.pdf.

At operation 312, the response from the generative machine learning model is parsed into a structured format. The parsing component 210 may parse the response into a structured file. For example, operation 312 may involve execution by the digital assistant configuration system 128 of a parsing algorithm such as the example algorithm included below.

Parsing Operations:

1. Split response by line breaks to separate individual expressions.
2. Remove lines that are empty or only contain non-text characters since the model may generate empty lines between expressions.
3. Take the last twenty elements. This may ensure that introductory text is dropped.
4. Apply a regex to remove numberings and quotation marks.

The method 300 proceeds to operation 314, where the digital assistant configuration system 128 stores the parsed response in the structured format (e.g., in a JSON or YAML file in the database 134). The digital assistant configuration system 128 then, at decision operation 316, checks whether sample expressions are needed for any further applications. If so, operation 308 to operation 314 are repeated for a further application. For example, once the digital assistant configuration system 128 has completed the generation of sample expressions for the "Create Sales Order-Automatic Extraction" application, it may proceed to generate sample expressions for each further application until all applications have sample expressions.

If, at decision operation 316, the digital assistant configuration system 128 determines that no further sample expressions need to be generated, the stored sample expressions are loaded to configure the digital assistant (operation 318), or to initiate such configuration by another component (e.g., the machine learning system 130), and the method 300 concludes at closing loop element 320. For example, and as described elsewhere, the sample expressions can be used to train an intent classification model of the digital assistant, to test the performance of the intent classification, to generate one or more configuration files, or combinations thereof.

Figure 5:
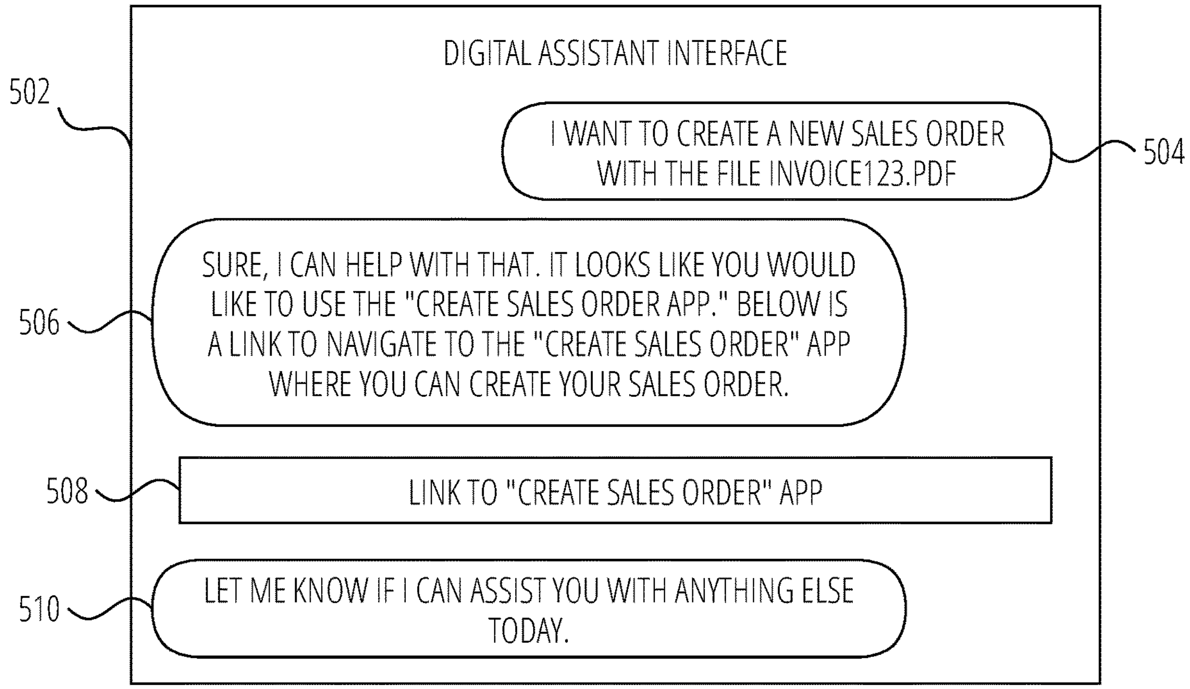
FIG. 5 is a user interface diagram of a digital assistant interface illustrating a first conversation, according to some examples.
Figure 6:
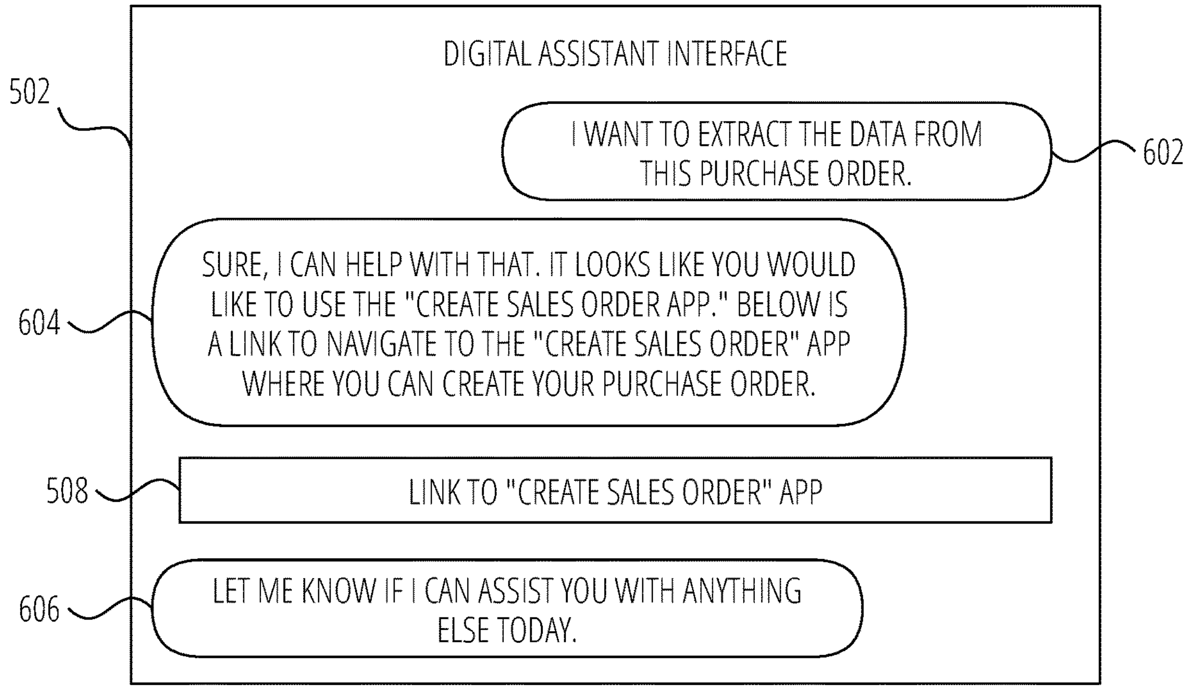
FIG. 6 is a user interface diagram of a digital assistant interface illustrating a second conversation, according to some examples.

In some examples, the digital assistant is defined by a set of YAML files. The sample expressions may be written into such configuration files in association with intents. For each intent, an associated action may be defined that should be triggered when the digital assistant identifies the intent. The action may also be defined in a configuration file. For example, the digital assistant may be configured to surface a link to an application when user input is recognized as relating to that application, as described in accordance with some examples, and as shown in FIG. 5 and FIG. 6.

When the sample expressions are used for testing purposes, sample expressions may be provided to the digital assistant as test inputs to obtain test responses. The test responses may be processed to generate performance data for the digital assistant based on one or more performance metrics. For example, the test responses may be compared to expected responses, with the performance of the digital assistant being quantified based on a percentage or proportion of test responses matching the expected responses (or based on some other performance metric).

While the method 300 of FIG. 3 includes generating and submitting a separate prompt per application, in other examples, a single prompt may cover multiple applications. For example, the prompt data may include the metadata for multiple applications and an instruction to generate a set of sample expressions for each respective application identified in the prompt data.

Figure 4:
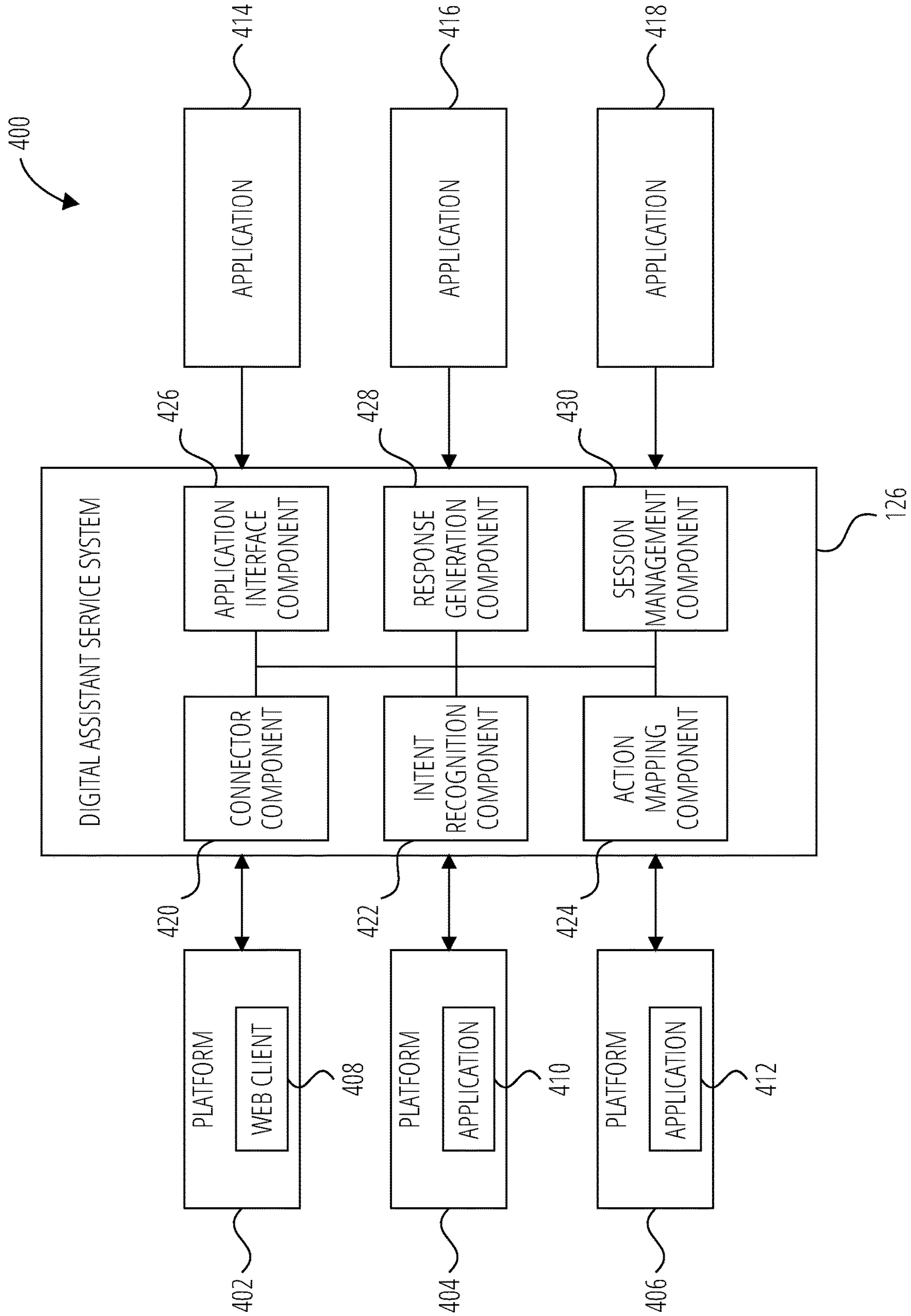
FIG. 4 diagrammatically illustrates certain components of a digital assistant service system, interactions of the digital assistant service system with a plurality of platforms, and links between the digital assistant service system and a plurality of software applications, according to some examples.

Once configured using the sample expressions that were generated using the method 300 of FIG. 3, the digital assistant can be implemented as part of the digital assistant service system 126 of FIG. 1. FIG. 4 is a diagram 400 that illustrates certain components of the digital assistant service system 126, interactions of the digital assistant service system 126 with a plurality of platforms 402, 404, 406, and links between the digital assistant service system and a plurality of applications 414, 416, 418, according to some examples.

The platforms 402-406 shown in FIG. 4 represent different client environments from which users may interact with the digital assistant. For example, users may access the digital assistant provided by the digital assistant service system 126 using a web client 408 associated with the platform 402, using an application 410 associated with the platform 404, or using an application 412 associated with the platform 406.

The digital assistant service system 126 is shown to include a connector component 420, an intent recognition component 422, an action mapping component 424, an application interface component 426, a response generation component 428, and a session management component 430. The metadata collection component 202 serves as an interface to external user systems and devices accessing the digital assistant. The connector component 420 is configured to handle or translate various protocols and data formats to normalize communications between user devices and the digital assistant service system 126. This enables support for devices accessing the digital assistant via different channels. The digital assistant may be configured to support multiple message types in addition to plain text (e.g., messages including images) or handle voice inputs.

The connector component 420 provides front-end integration functionality allowing, for example, the user 108 of FIG. 1 to open an application in the web client 112 and interact with the digital assistant via a chat window. The connector component 420 is configured to enable the digital assistant service system 126 to integrate with the different platforms 402-406. For example, the platform 402 may be a human resources management tool that has the digital assistant integrated into its web client 408, while the platform 404 is a data analytics platform that has the digital assistant integrated into its application 410, and the platform 406 is a cloud analytics ecosystem that provides the digital assistant as part of, or overlaid onto, the application 412.

The connector component 420 may be responsible for providing a user interface, receiving user input provided to the digital assistant, and passing the user input on to one or more other components, such as the intent recognition component 422. The connector component 420 may also be responsible for providing responses generated by the response generation component 428 back to a user via the user interface.

The intent recognition component 422 processes and interprets user input to ascertain the underlying intent thereof. The intent recognition component 422 may be part of a larger natural language processing or understanding system within the digital assistant service system 126. For example, by utilizing natural language processing techniques, the intent recognition component 422 analyzes the language and context of user input to classify it into predefined intent categories. For example, if a user inputs "I would like to book a flight to New York," the intent recognition component 422 discerns the intent to book travel. The intent recognition component 422 may, for example, flag a particular intent, such as "book_travel."

Where the intent recognition component 422 utilizes an intent classification model, the intent classification model may be trained on sample expressions generated using techniques described herein. The intent classification model may be trained using, for example, supervised learning, to process input and output a most likely intent, or a set of intents with a likelihood score for each. By utilizing a high-quality and diverse training data set, the intent classification model may be trained to distinguish between semantically similar intents such as "book_travel" (which could map to a travel booking application) and "claim_travel" (which could map to an expense claim application). Furthermore, the intent classification model may be trained to "understand" that semantically different user inputs can map to the same action (e.g., "scan purchase order" and "create new invoice" could be associated with navigating to the same application).

The action mapping component 424 is configured to link recognized intents to corresponding actions that the digital assistant service system 126 should execute. Upon receiving a classified intent from the intent recognition component 422, the action mapping component 424 checks for a corresponding action (e.g., stored in the database 134 of FIG. 1) and initiates the action. For example, upon recognizing an intent to book travel, the action mapping component 424 triggers the surfacing of a link to the travel booking application.

The application interface component 426 serves as the gateway between the digital assistant service system 126 and applications or services, such as the applications 414-418. For example, the application interface component 426 may enable the digital assistant service system 126 to access a current link (e.g., a Uniform Resource Locator (URL)) to access each of the applications 414-418 such that, when an action is associated with a particular application, the digital assistant service system 126 can surface the link to the user (or, in some examples, automatically navigate the user to the application via the link). For example, the application 414 may be the travel booking application. Once the action mapping component 424 triggers the surfacing of the link to the travel booking application, the application interface component 426 fetches or provides the current link.

The response generation component 428 generates responses that are presented to the user (e.g., in a user interface of the digital assistant on the user device 106 of FIG. 1). The response generation component 428 may utilize predetermined responses, dialog management techniques, automatically generated responses based on natural language processing algorithms, machine learning model-generated responses, or combinations thereof. The response generation component 428 may be configured to provide clear and helpful feedback to the user. For example, where an action is triggered by a recognized intent, the response generation component 428 may generate a response that indicates or explains the triggered action to the user. The response generation component 428 may also facilitate follow-up inputs by encouraging the user to continue with a conversation.

The session management component 430 maintains continuity and context of interactions over the course of a session. The session management component 430 may track the state of a conversation, storing relevant data and user preferences to ensure that the digital assistant can provide personalized and accurate responses throughout the interaction. For example, if a user is in the process of booking a hotel and pauses or leaves the conversation, the session management component 430 can retain the details of the booking so that the user can resume the process without starting over.

In some examples, the digital assistant service system 126 thus makes it easier for a user to access one of the applications 414-418, for example, by facilitating user navigation to a desired application. In some examples, the applications 414-418 also provide capabilities and data sources that are leveraged by the digital assistant. For example, the application 416 may be associated with a customer relationship management system from which the digital assistant service system 126 can retrieve information in response to a user query, while the application 418 is associated with a billing system from which the digital assistant service system 126 can retrieve information in response to a user query. In some examples, the digital assistant can also trigger actions directly within the applications 414-418 without the user having to navigate to the relevant application.

The response generation component 428 may generate suitable responses based at least in part on information retrieved or actions performed via the applications 414-418. Loose coupling (e.g., via APIs) may allow connected applications or services to evolve independently, or to be dynamically changed, while still being available to be leveraged by the digital assistant service system 126.

In some examples, at least some of the components shown in FIG. 1, FIG. 2, or FIG. 4 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

FIG. 5 and FIG. 6 are user interface diagrams illustrating a digital assistant interface 502, according to some examples. The digital assistant interface 502 can, for example, be displayed on a display of the user device 106 of FIG. 1 (e.g., via the web client 112). However, the digital assistant interface 502 may be presented in various other ways (e.g., within a dedicated mobile application) and on various types of devices.

As mentioned, the digital assistant may be provided as a support tool that is presented as a window in association with a primary application or dashboard. The user may thus use the digital assistant to obtain information about applications or features (e.g., applications or features supported by the server system 104) and to obtain assistance in navigating to applications or features.

In the examples of FIG. 5 and FIG. 6, the digital assistant is provided by a digital assistant service system such as the digital assistant service system 126 of FIG. 1. The digital assistant service system is configured to facilitate quicker and easier navigation to a desired application. For example, a user may have access to a large number of web applications (e.g., hundreds or thousands of applications that are accessible either directly or via a central dashboard). In response to a user query or command, the digital assistant identifies an application to which the query or command relates, and facilitates accessing of the application by the user.

The digital assistant is configured using sample expressions that were generated based on techniques described herein. In the examples of FIG. 5 and FIG. 6, the digital assistant executes an intent classification model in the example form of a text classification machine learning model that was trained on a diverse range of sample expressions generated by an LLM (e.g., the LLM 118).

FIG. 5 illustrates a first conversation between a user (e.g., the user 108 of FIG. 1) and the digital assistant. The user submits a user input 504 that indicates that the user wishes to create a new sales order. As mentioned, the user has access to a large number of web applications and may find it difficult or cumbersome to locate, or navigate to, the appropriate application for creating a new sales order.

The user input 504 is processed by the digital assistant. The digital assistant identifies the intent of the user input 504. For example, the intent classification model processes the text of the user input 504 and returns an intent label that it has found to be the most likely intent. The digital assistant then detects that the action associated with the intent is to provide the user with access to a "Create Sales Order" application. The digital assistant generates a first response 506 indicating that the "Create Sales Order" application is suitable for performing the function that the user wishes to perform, and that a link to the application is provided.

A user-selectable element 508 is presented in the digital assistant interface 502. The user-selectable element 508 functions as a link to the "Create Sales Order" application. If the user selects the user-selectable element 508, the digital assistant service system causes the user device of the user to be navigated to the "Create Sales Order" application (e.g., a user interface of the "Create Sales Order" application is automatically presented). In some examples, a digital assistant window may remain available to the user even if the user device is navigated to another application.

The user-selectable element 508 thus provides a quick and easy way for the user to access the application for which the identified intent, and its associated action, were created or defined within the digital assistant. A second response 510 is also generated and presented in the digital assistant interface 502, and the conversation may continue should the user need further assistance from the digital assistant.

FIG. 6 illustrates a second conversation between a user (e.g., the user 108 of FIG. 1) and the digital assistant in the digital assistant interface 502. The user submits a user input 602 that indicates that the user wishes to extract data from a purchase order. The user input 602 is processed by the digital assistant.

Based on the diverse range of sample expressions on which the intent classification model was trained, the digital assistant can detect that both the user input 504 of FIG. 5 and the user input 602 of FIG. 6, while semantically different, refer to functions that can both be performed using the same application. Accordingly, the digital assistant identifies the intent of the user input 602 and detects that the action associated with the intent is to provide the user with access to the "Create Sales Order" application, as is the case in FIG. 5. The digital assistant generates a first response 604 indicating that the "Create Sales Order" application is suitable for performing the function that the user wishes to perform, and that a link to the application is provided. The user-selectable element 508 is presented in the digital assistant interface 502, as explained above. A second response 606 is also generated and presented in the digital assistant interface 502, and the conversation may continue should the user need further assistance from the digital assistant.

In some examples, the "action" related to the application, as identified automatically by a digital assistant, is to provide a user with access to the application (e.g., by surfacing a link). However, it will be appreciated that an action related to an application is not limited to providing access to the application, and that, in other examples, various other actions related to applications may be triggered using techniques described herein. For example, an action for the intent "play_music" may involve accessing a music streaming service and starting playback of a specified song or playlist. As another example, an action for the intent "retrieve_invoice" may involve automatically transmitting an email with a copy of an invoice to a user device.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: accessing, for each of a plurality of applications, metadata comprising a functional description of the application; providing, to a generative machine learning model, prompt data comprising the metadata for each of the plurality of applications and an instruction to generate, for each of the plurality of applications, a plurality of sample expressions corresponding to user input provided to a digital assistant to invoke an action related to the application; processing one or more responses generated by the generative machine learning model based on the prompt data to obtain output data comprising the plurality of sample expressions for each of the plurality of applications in a structured format; and using the output data to configure the digital assistant.

In Example 2, the subject matter of Example 1 includes, wherein, for each of the plurality of applications, the plurality of sample expressions correspond to user input notionally provided to the digital assistant to convey one or more intents linked to the action within the digital assistant.

In Example 3, the subject matter of any of Examples 1-2 includes, wherein the using of the output data to configure the digital assistant comprises using the output data to train an intent classification machine learning model of the digital assistant.

In Example 4, the subject matter of Example 3 includes, the operations further comprising, subsequent to the configuration of the digital assistant using the output data: receiving first user input comprising a first expression; processing the first expression using the intent classification machine learning model to obtain an intent classification for the first expression; identifying, based on the intent classification, a first application of the plurality of applications; and invoking the action related to the application.

In Example 5, the subject matter of any of Examples 1-4 includes, wherein the using of the output data to configure the digital assistant comprises using the output data to generate one or more configuration files of the digital assistant.

In Example 6, the subject matter of Examples 1-5 includes, wherein the using of the output data to configure the digital assistant comprises: providing at least a subset of the plurality of sample expressions for each of the plurality of applications to the digital assistant as test inputs to obtain test responses; processing the test responses to generate performance data for the digital assistant based on one or more performance metrics; and causing presentation of the performance data in a user interface.

In Example 7, the subject matter of any of Examples 1-6 includes, wherein the action related to the application comprises providing a user of the digital assistant with access to the application, the operations further comprising: receiving first user input comprising a first expression; processing the first expression using the digital assistant to identify a first application of the plurality of applications; generating an interface element that is user-selectable to provide access to the application; and causing presentation, at a user device associated with the user, of the interface element in a user interface of the digital assistant.

In Example 8, the subject matter of Example 7 includes, wherein the user interface is a first user interface, the operations further comprising: receiving second user input comprising a user selection of the interface element; and in response to receiving the user selection, causing presentation, at the user device of the user, of a second user interface of the application.

In Example 9, the subject matter of any of Examples 1-8 includes, the operations further comprising, for each of the plurality of applications: accessing a prompt template in which a first subset of the prompt data is prepopulated; accessing an application metadata library to obtain a second subset of the prompt data, the second subset of the prompt data comprising the functional description of the application; and integrating the second subset of the prompt data into the first subset of the prompt data prior to providing the prompt data to the generative machine learning model.

In Example 10, the subject matter of Example 9 includes, the operations further comprising: performing a data cleaning operation on the second subset of the prompt data prior to integrating the second subset of the prompt data into the first subset of the prompt data.

In Example 11, the subject matter of Examples 1-10 includes, wherein the instruction in the prompt data identifies a response format in which to provide the one or more responses, and wherein the processing of the output data comprises parsing the one or more responses provided in the response format to obtain the output data in the structured format.

In Example 12, the subject matter of any of Examples 1-11 includes, wherein the metadata further comprises a name of the application, and the name and the functional description are provided in natural language format.

In Example 13, the subject matter of any of Examples 1-12 includes, wherein the prompt data further comprises at least one of: a role definition indicating a role of the generative machine learning model, an indication of a predetermined number of sample expressions to generate for each of the plurality of applications, or illustrative examples of sample expressions.

In Example 14, the subject matter of any of Examples 1-13 includes, wherein the generative machine learning model comprises an LLM.

Example 15 is a method comprising: accessing, by one or more computing devices, for each of a plurality of applications, metadata comprising a functional description of the application; providing, by the one or more computing devices, prompt data to a generative machine learning model, the prompt data comprising the metadata for each of the plurality of applications and an instruction to generate, for each of the plurality of applications, a plurality of sample expressions corresponding to user input provided to a digital assistant to invoke an action related to the application; processing, by the one or more computing devices, one or more responses generated by the generative machine learning model based on the prompt data to obtain output data comprising the plurality of sample expressions for each of the plurality of applications in a structured format; and using, by the one or more computing devices, the output data to configure the digital assistant.

In Example 16, the subject matter of Example 15 includes, wherein the using of the output data to configure the digital assistant comprises using the output data to train an intent classification machine learning model of the digital assistant.

In Example 17, the subject matter of Example 16 includes, subsequent to the configuration of the digital assistant using the output data: receiving, by the one or more computing devices, first user input comprising a first expression; processing, by the one or more computing devices and using the intent classification machine learning model, the first expression to obtain an intent classification for the first expression; identifying, by the one or more computing devices and based on the intent classification, a first application of the plurality of applications; and invoking, by the one or more computing devices, the action related to the application.

Example 18 is a non-transitory computer-readable medium that stores instructions that, when executed by one or more processors, cause the one or more processors to perform operations comprising: accessing, for each of a plurality of applications, metadata comprising a functional description of the application; providing, to a generative machine learning model, prompt data comprising the metadata for each of the plurality of applications and an instruction to generate, for each of the plurality of applications, a plurality of sample expressions corresponding to user input provided to a digital assistant to invoke an action related to the application; processing one or more responses generated by the generative machine learning model based on the prompt data to obtain output data comprising the plurality of sample expressions for each of the plurality of applications in a structured format; and using the output data to configure the digital assistant.

In Example 19, the subject matter of Example 18 includes, wherein the using of the output data to configure the digital assistant comprises using the output data to train an intent classification machine learning model of the digital assistant.

In Example 20, the subject matter of Example 19 includes, the operations further comprising, subsequent to the configuration of the digital assistant using the output data: receiving first user input comprising a first expression; processing the first expression using the intent classification machine learning model to obtain an intent classification for the first expression; identifying, based on the intent classification, a first application of the plurality of applications; and invoking the action related to the application.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 7:
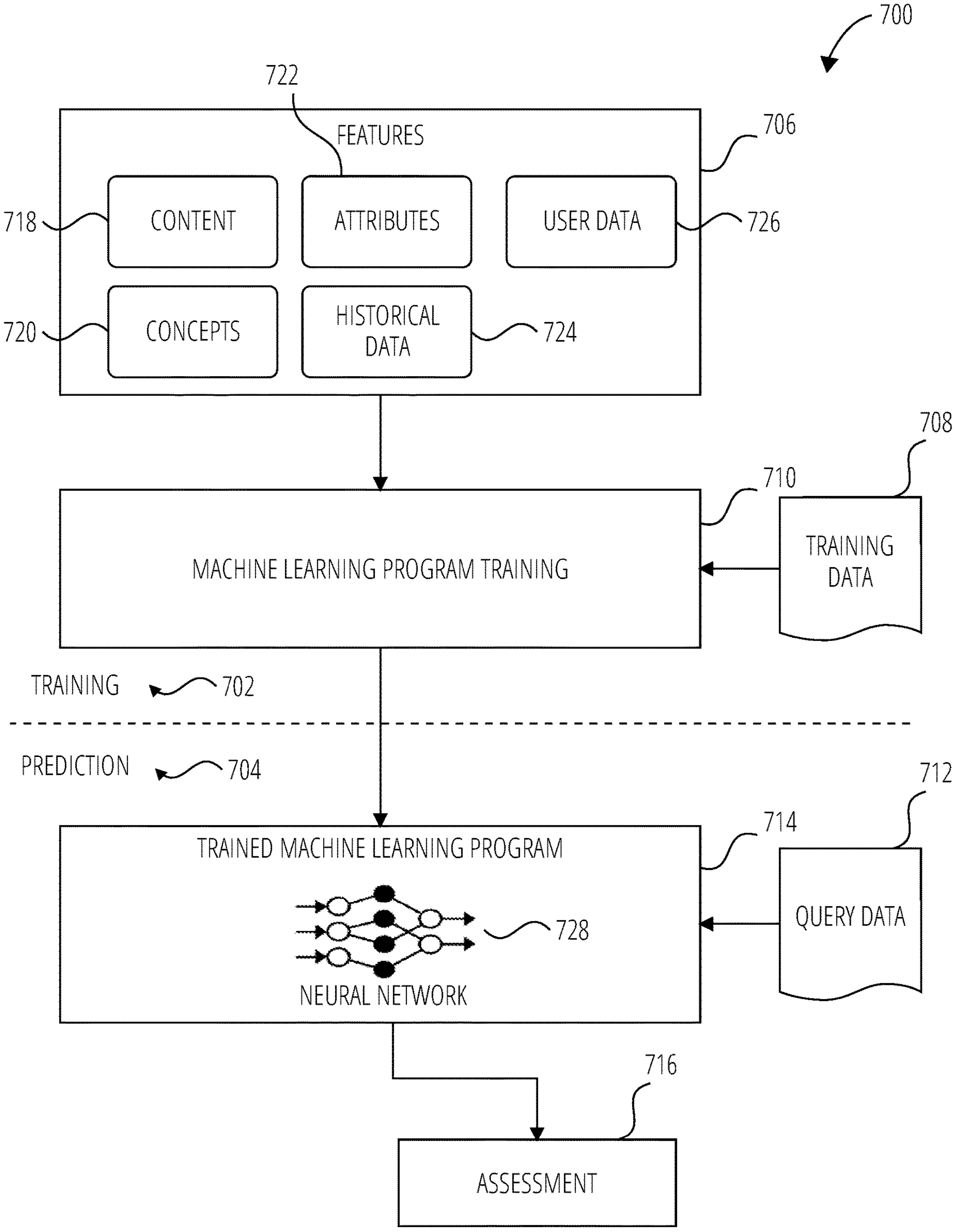
FIG. 7 diagrammatically illustrates training and use of a machine learning program, according to some examples.

FIG. 7 is a block diagram showing a machine learning program 700, according to some examples. Machine learning programs, also referred to as machine learning algorithms or tools, may be used as part of the systems described herein to perform one or more operations, e.g., to identify relations between reported issues and context data, to identify contextual dependencies, to extract or infer additional issue metadata using initial issue metadata, to generate priority ratings, to generate estimated impacts, or combinations thereof.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 708 in order to make data-driven predictions or decisions expressed as outputs or assessments (e.g., assessment 716). Although examples are presented with respect to a few machine learning tools, the principles presented herein may be applied to other machine learning tools.

In some examples, different machine learning tools may be used. For example, Logistic Regression (LR), naïve-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 700 supports two types of phases, namely training phases 702 and prediction phases 704. In training phases 702, supervised learning, unsupervised or reinforcement learning may be used. For example, the machine learning program 700 (1) receives features 706 (e.g., as structured or labeled data in supervised learning)

and/or (2) identifies features 706 (e.g., unstructured or unlabeled data for unsupervised learning) in training data 708. In prediction phases 704, the machine learning program 700 uses the features 706 for analyzing query data 712 to generate outcomes or predictions, as examples of an assessment 716.

In the training phase 702, feature engineering is used to identify features 706 and may include identifying informative, discriminating, and independent features for the effective operation of the machine learning program 700 in pattern recognition, classification, and regression. In some examples, the training data 708 includes labeled data, which is known data for pre-identified features 706 and one or more outcomes. Each of the features 706 may be a variable or attribute, such as individual measurable property of a process, article, system, or phenomenon represented by a data set (e.g., the training data 708). Features 706 may also be of different types, such as numeric features, strings, and graphs, and may include one or more of content 718, concepts 720, attributes 722, historical data 724 and/or user data 726, merely for example.

The concept of a feature in this context is related to that of an explanatory variable used in statistical techniques such as linear regression. Choosing informative, discriminating, and independent features is important for the effective operation of the machine learning program 700 in pattern recognition, classification, and regression. Features may be of different types, such as numeric features, strings, and graphs.

In training phases 702, the machine learning program 700 uses the training data 708 to find correlations among the features 706 that affect a predicted outcome or assessment 716.

With the training data 708 and the identified features 706, the machine learning program 700 is trained during the training phase 702 at machine learning program training 710. The machine learning program 700 appraises values of the features 706 as they correlate to the training data 708. The result of the training is the trained machine learning program 714 (e.g., a trained or learned model).

Further, the training phases 702 may involve machine learning, in which the training data 708 is structured (e.g., labeled during preprocessing operations), and the trained machine learning program 714 implements a relatively simple neural network 728 capable of performing, for example, classification and clustering operations. In other examples, the training phase 702 may involve deep learning, in which the training data 708 is unstructured, and the trained machine learning program 714 implements a deep neural network 728 that is able to perform both feature extraction and classification/clustering operations.

A neural network 728 generated during the training phase 702, and implemented within the trained machine learning program 714, may include a hierarchical (e.g., layered) organization of neurons. For example, neurons (or nodes) may be arranged hierarchically into a number of layers, including an input layer, an output layer, and multiple hidden layers. Each of the layers within the neural network 728 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 728 may also be one of a number of different types of neural networks, including a single-layer feed-forward network, an Artificial Neural Network (ANN), a Recurrent Neural Network (RNN), a symmetrically connected neural network, and unsupervised pre-trained network, a transformer network, a Convolutional Neural Network (CNN), or a Recursive Neural Network (RNN), merely for example.

During prediction phases 704, the trained machine learning program 714 is used to perform an assessment. Query data 712 is provided as an input to the trained machine learning program 714, and the trained machine learning program 714 generates the assessment 716 as output, responsive to receipt of the query data 712.

In some examples, the trained machine learning program 714 may be a generative artificial intelligence (AI) model. Generative AI is a term that may refer to any type of AI that can create new content. For example, generative AI can produce text, images, video, audio, code, or synthetic data. In some examples, the generated content may be similar to the original data, but not identical.

Some of the techniques that may be used in generative AI are:

- CNNs: CNNs may be used for image recognition and computer vision tasks. CNNs may, for example, be designed to extract features from images by using filters or kernels that scan the input image and highlight important patterns.
- RNNs: RNNs may be used for processing sequential data, such as speech, text, and time series data, for example. RNNs employ feedback loops that allow them to capture temporal dependencies and remember past inputs.
- GANs: GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.
- Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.
- Transformer models: Transformer models may use attention mechanisms to learn the relationships between different parts of input data (such as words or pixels) and generate output data based on these relationships. Transformer models can handle sequential data, such as text or speech, as well as non-sequential data, such as images or code. For example, the LLM 118 of FIG. 1 may be a transformer model, or may be based on a transformer model. Non-limiting examples of LLMs that use transformer models include GPT-4 (Generative Pre-trained Transformer 4) developed by OpenAI™, BERT (Bidirectional Encoder Representations from Transformers) developed by Google™, LLAMA (Large Language Model Meta AI) developed by Meta™, and PaLM2 (Pathways Language Model 2) developed by Google™.

In generative AI examples, the assessment 716 generated as a response or output by the trained machine learning program 714 may include predictions, translations, summaries, answers to questions, suggestions, media content, or combinations thereof. For example, the LLM 118 of FIG. 1 may generate natural language responses to mimic or replicate user expressions.

In some examples, a machine learning model may be fine-tuned. The term "fine-tuning," as used herein, generally refers to a process of adapting a pre-trained machine learning model. For example, a machine learning model may be adapted to improve its performance on a specific task or to make it more suitable for a specific operation. Fine-tuning techniques may include one or more of updating or changing a pre-trained model's internal parameters through additional training, injecting new trainable weights or layers into the model architecture and training on those weights or layers, modifying a model topology by altering layers or connections, changing aspects of the training process (such as loss functions or optimization methods), or any other adaptations that may, for example, result in better model performance on a particular task compared to the pre-trained model.

Figure 8:
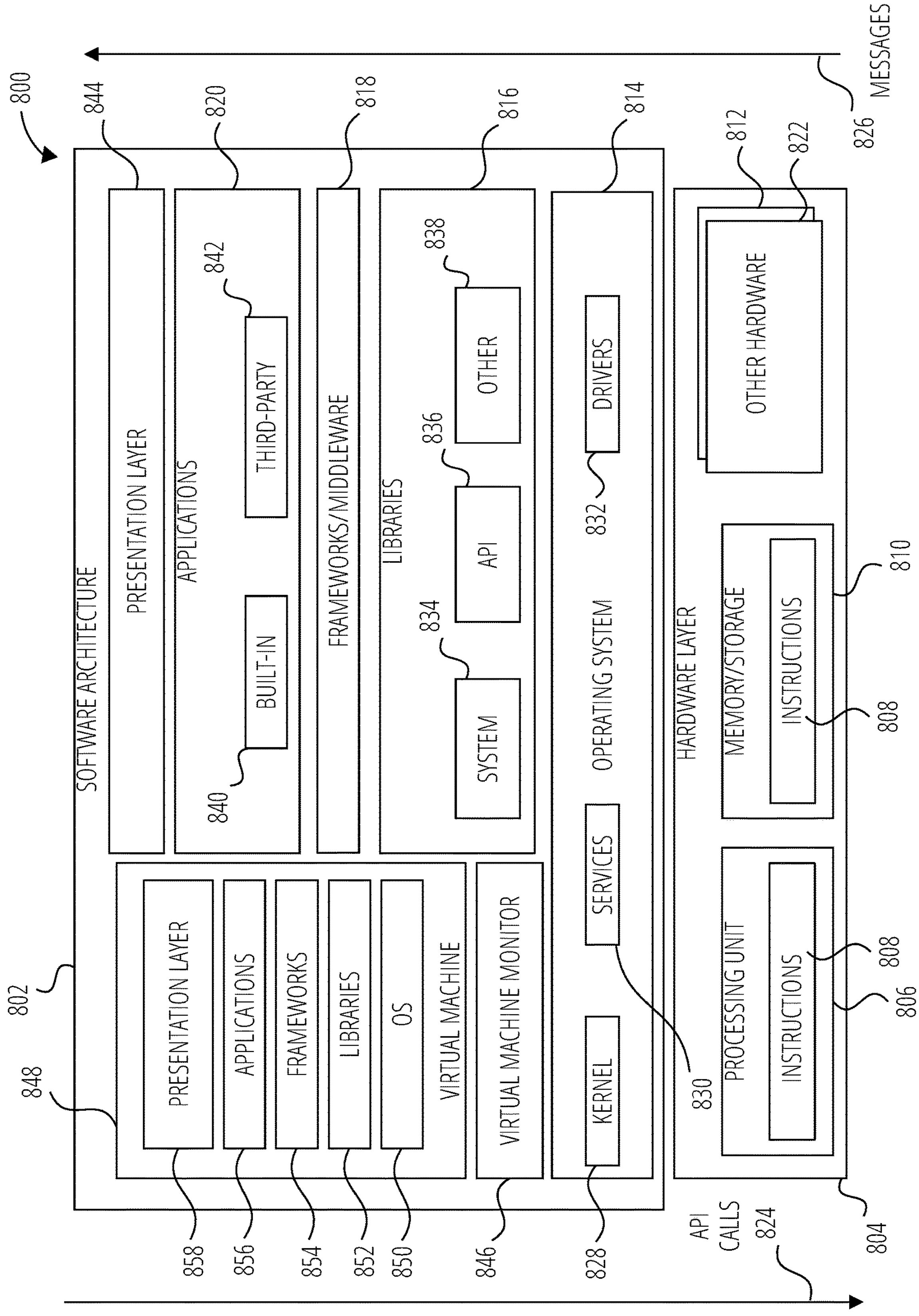
FIG. 8 is a block diagram showing a software architecture for a computing device, according to some examples.

FIG. 8 is a block diagram 800 showing a software architecture 802 for a computing device, according to some examples. The software architecture 802 may be used in conjunction with various hardware architectures, for example, as described herein. FIG. 8 is merely a non-limiting illustration of a software architecture, and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 9.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 and other hardware 822 which represent any other hardware of the hardware layer 804, such as the other hardware illustrated as part of the software architecture 802.

In the architecture of FIG. 8, the software architecture 802 may be conceptualized as a stack of layers where each layer provides particular functionality. For example, the software architecture 802 may include layers such as an operating system 814, libraries 816, frameworks/middleware layer 818, applications 820, and presentation layer 844. Operationally, the applications 820 or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the software architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 816 may provide a common infrastructure that may be utilized by the applications 820 or other components or layers. The libraries 816 typically provide functionality that allows other software modules to perform tasks in an easier fashion than to interface directly with the underlying operating system 814 functionality (e.g., kernel 828, services 830 or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks/middleware layer 818 may provide a higher-level common infrastructure that may be utilized by the applications 820 or other software components/modules. For example, the frameworks/middleware layer 818 may provide various graphic user interface (GUI) functions, high-level resource management, high-level location services, and so forth. The frameworks/middleware layer 818 may provide a broad spectrum of other APIs that may be utilized by the applications 820 or other software components/modules, some of which may be specific to a particular operating system or platform.

The applications 820 include built-in applications 840 or third-party applications 842. Examples of representative built-in applications 840 may include, but are not limited to, a contacts application, a browser application, a book reader application, a location application, a media application, a messaging application, or a game application. Third-party applications 842 may include any of the built-in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built in operating system functions (e.g., kernel 828, services 830 or drivers 832), libraries (e.g., system libraries 834, API libraries 836, and other libraries 838), and frameworks/middleware layer 818 to create user interfaces to interact with users of the system. Alternatively, or additionally, in some systems, interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (e.g., operating system 814). A software architecture executes within the virtual machine 848 such as an operating system 850, libraries 852, frameworks/middleware 854, applications 856 or presentation layer 858. These layers of software architecture executing within the virtual machine 848 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations. It will be appreciated that the decision to implement a hardware-implemented module/component mechanically, in dedicated and permanently configured circuitry, or in temporarily configured circuitry (e.g., configured by software) may be driven by cost and time considerations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output. Hardware-implemented modules/components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines. In some examples, the processor or processors may be located in a single location (e.g., within a home environment, an office environment, or a server farm), while in other examples the processors may be distributed across a number of locations.

The one or more processors may also operate to support performance of the relevant operations in a "cloud computing" environment or as a "software as a service (Saas)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In examples, operations may be performed by one or more programmable processors executing a computer program to perform functions by operating on input data and generating output. Method operations can also be performed by, and apparatus of some examples may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various examples.

Figure 9:
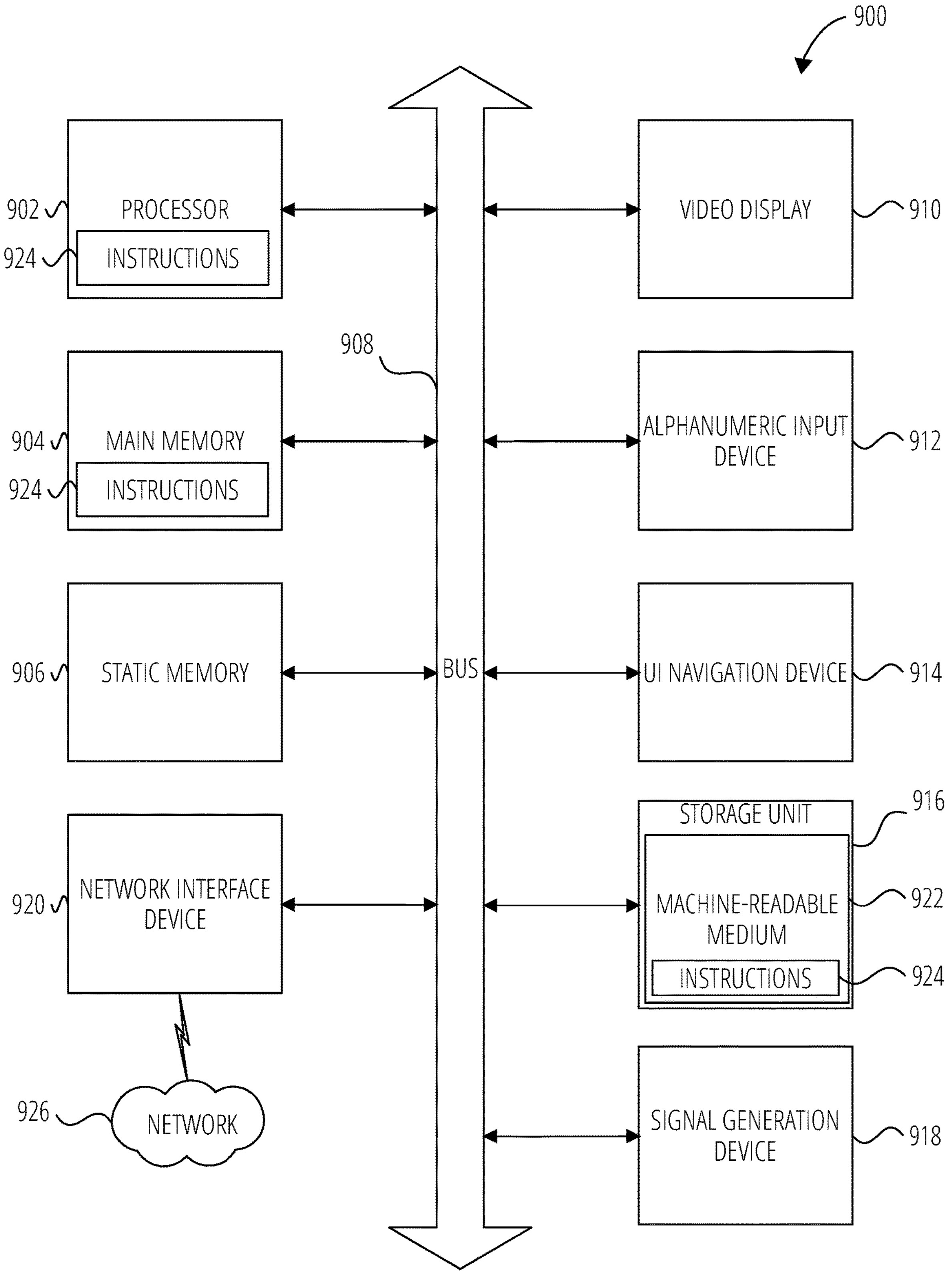
FIG. 9 is a block diagram of a machine in the form of a computer system, according to some examples, within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a GPU, or both), a primary or main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a UI navigation (or cursor control) device 914 (e.g., a mouse), a storage unit 916, a signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 or within the processor 902 during execution thereof by the computer system 900, with the main memory 904 and the processor 902 also each constituting a machine-readable medium 922.

While the machine-readable medium 922 is shown in accordance with some examples to be a single medium, the term "machine-readable medium" may include a single medium or multiple media (e.g., a centralized or distributed database, or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of a machine-readable medium 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 924 may further be transmitted or received over a communications network 926 using a transmission medium. The instructions 924 may be transmitted using the network interface device 920 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 924 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. The word "or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:

at least one memory that stores instructions; and one or more processors configured by the instructions to perform operations comprising:

accessing, for each of a plurality of applications, metadata comprising a functional description of the application;

providing, to a generative machine learning model, prompt data comprising the metadata for each of the plurality of applications and an instruction to generate, for each of the plurality of applications, a plurality of sample expressions corresponding to user input provided to a digital assistant to invoke an action related to the application;

processing one or more responses generated by the generative machine learning model based on the prompt data to obtain output data comprising the plurality of sample expressions for each of the plurality of applications in a structured format; and using the output data to configure the digital assistant.

2. The system of claim 1, wherein, for each of the plurality of applications, the plurality of sample expressions correspond to user input notionally provided to the digital assistant to convey one or more intents linked to the action within the digital assistant.

3. The system of claim 1, wherein the using of the output data to configure the digital assistant comprises using the output data to train an intent classification machine learning model of the digital assistant.

4. The system of claim 3, the operations further comprising, subsequent to the configuration of the digital assistant using the output data:

receiving first user input comprising a first expression;

processing the first expression using the intent classification machine learning model to obtain an intent classification for the first expression;

identifying, based on the intent classification, a first application of the plurality of applications; and invoking the action related to the application.

5. The system of claim 1, wherein the using of the output data to configure the digital assistant comprises using the output data to generate one or more configuration files of the digital assistant.

6. The system of claim 1, wherein the using of the output data to configure the digital assistant comprises:
providing at least a subset of the plurality of sample expressions for each of the plurality of applications to the digital assistant as test inputs to obtain test responses;
processing the test responses to generate performance data for the digital assistant based on one or more performance metrics; and
causing presentation of the performance data in a user interface.

7. The system of claim 1, wherein the action related to the application comprises providing a user of the digital assistant with access to the application, the operations further comprising:
receiving first user input comprising a first expression;
processing the first expression using the digital assistant to identify a first application of the plurality of applications;
generating an interface element that is user-selectable to provide access to the application; and
causing presentation, at a user device associated with the user, of the interface element in a user interface of the digital assistant.

8. The system of claim 7, wherein the user interface is a first user interface, the operations further comprising:
receiving second user input comprising a user selection of the interface element; and
in response to receiving the user selection, causing presentation, at the user device of the user, of a second user interface of the application.

9. The system of claim 1, the operations further comprising, for each of the plurality of applications:
accessing a prompt template in which a first subset of the prompt data is prepopulated;
accessing an application metadata repository to obtain a second subset of the prompt data, the second subset of the prompt data comprising the functional description of the application; and
integrating the second subset of the prompt data into the first subset of the prompt data prior to providing the prompt data to the generative machine learning model.

10. The system of claim 9, the operations further comprising:
performing a data cleaning operation on the second subset of the prompt data prior to integrating the second subset of the prompt data into the first subset of the prompt data.

11. The system of claim 1, wherein the instruction in the prompt data identifies a response format in which to provide the one or more responses, and wherein the processing of the output data comprises parsing the one or more responses provided in the response format to obtain the output data in the structured format.

12. The system of claim 1, wherein the metadata further comprises a name of the application, and the name and the functional description are provided in natural language format.

13. The system of claim 1, wherein the prompt data further comprises at least one of: a role definition indicating a role of the generative machine learning model, an indication of a predetermined number of sample expressions to generate for each of the plurality of applications, or illustrative examples of sample expressions.

14. The system of claim 1, wherein the generative machine learning model comprises a large language model (LLM).

15. A method comprising:
accessing, by one or more computing devices, for each of a plurality of applications, metadata comprising a functional description of the application;
providing, by the one or more computing devices, prompt data to a generative machine learning model, the prompt data comprising the metadata for each of the plurality of applications and an instruction to generate, for each of the plurality of applications, a plurality of sample expressions corresponding to user input provided to a digital assistant to invoke an action related to the application;
processing, by the one or more computing devices, one or more responses generated by the generative machine learning model based on the prompt data to obtain output data comprising the plurality of sample expressions for each of the plurality of applications in a structured format; and
using, by the one or more computing devices, the output data to configure the digital assistant.

16. The method of claim 15, wherein the using of the output data to configure the digital assistant comprises using the output data to train an intent classification machine learning model of the digital assistant.

17. The method of claim 16, further comprising, subsequent to the configuration of the digital assistant using the output data:
receiving, by the one or more computing devices, first user input comprising a first expression;
processing, by the one or more computing devices and using the intent classification machine learning model, the first expression to obtain an intent classification for the first expression;
identifying, by the one or more computing devices and based on the intent classification, a first application of the plurality of applications; and
invoking, by the one or more computing devices, the action related to the application.

18. A non-transitory computer-readable medium that stores instructions that, when executed by one or more processors, cause the one or more processors to perform operations comprising:
accessing, for each of a plurality of applications, metadata comprising a functional description of the application;
providing, to a generative machine learning model, prompt data comprising the metadata for each of the plurality of applications and an instruction to generate, for each of the plurality of applications, a plurality of sample expressions corresponding to user input provided to a digital assistant to invoke an action related to the application;
processing one or more responses generated by the generative machine learning model based on the prompt data to obtain output data comprising the plurality of sample expressions for each of the plurality of applications in a structured format; and
using the output data to configure the digital assistant.

19. The non-transitory computer-readable medium of claim 18, wherein the using of the output data to configure the digital assistant comprises using the output data to train an intent classification machine learning model of the digital assistant.

20. The non-transitory computer-readable medium of claim 19, the operations further comprising, subsequent to the configuration of the digital assistant using the output data:

receiving first user input comprising a first expression;

processing the first expression using the intent classification machine learning model to obtain an intent classification for the first expression;

identifying, based on the intent classification, a first application of the plurality of applications; and invoking the action related to the application.

* * * * *